(No Model.)
K. W. GRESS.
DUST PAN.
No. 534,875. Patented Feb. 26, 1895.
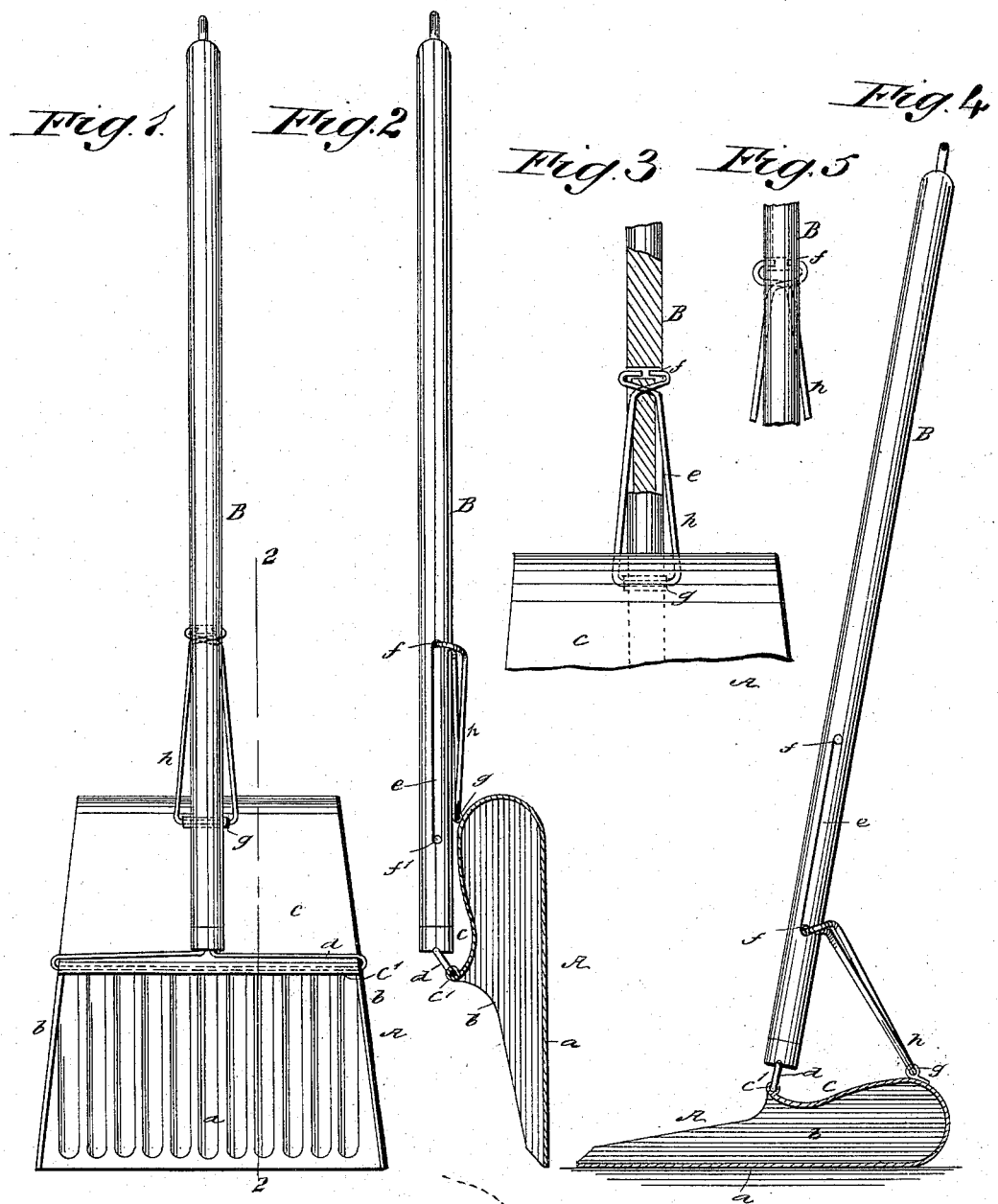
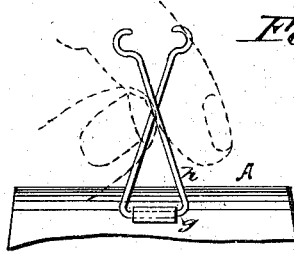
WITNESSES:
F. M. McArdle
G. M. Hopkins.
INVENTOR
K. W. Gress
BY
Munn & Co
ATTORNEYS.

UNITED STATES PATENT OFFICE.

KENT WELLINGTON GRESS, OF SAN FRANCISCO, CALIFORNIA.

DUST-PAN.

SPECIFICATION forming part of Letters Patent No. 534,875, dated February 26, 1895.

Application filed October 25, 1894. Serial No. 526,953. (No model.)

*To all whom it may concern:*

Be it known that I, KENT WELLINGTON GRESS, of San Francisco, in the county of San Francisco and State of California, have invented a new and Improved Dust-Pan, of which the following is a specification, reference being had to the annexed drawings, forming a part thereof, in which—

Figure 1 is a plan view of my improved dust pan. Fig. 2 is a longitudinal section taken on line 2—2 in Fig. 1. Fig. 3 is a plan view showing the handle in section. Fig. 4 is a side sectional elevation showing the handle in an elevated position. Fig. 5 is a front elevation of the handle; and Fig. 6 is a detail view of the brace which supports the handle.

Similar letters of reference indicate corresponding parts in all the views.

The object of my invention is to provide a dust pan having a long handle which may be adjusted for different positions.

My invention consists in a dust pan preferably made of a single piece of sheet metal and provided with a pocket in the rear portion for receiving the dust, and in the combination with the pan, of a long handle pivoted to the top thereof, and provided with transverse perforations and grooves in opposite sides connecting the perforations, and a spring brace pivotally connected with the rear portion of the pan, and having at its front ends fingers which project into the grooves and perforations of the handle, all as will be hereinafter more fully described.

The dust pan A is preferably formed of a single sheet of metal with the bottom $a$ wide in front and narrow at the rear, and the sides $b$ turned up at right angles to the bottom, and the back and top $c$ formed of a continuation of the metal of the bottom, the back and top being secured to the sides by soldering or otherwise. The front edge of the top $c$ is turned over as at $c'$, forming a hollow bead in which is inserted a wire $d$, which is bent over parallel with the bead, with its adjoining ends bent outwardly at right angles, to receive the end of the handle B.

In opposite sides of the handle, a short distance above the pan A there are longitudinal grooves $e$, and at the upper and lower ends of the grooves are transverse holes $f f'$ extending through the handle. In a loop $g$ at the rear of the dust pan is inserted a spring wire $h$, the ends of which are bent outwardly approximately at right angles, and crossed, as shown, the extremities being bent forward and curved, with the ends bent inwardly toward each other, forming fingers which enter the grooves $e$ or the holes $f f'$.

When the handle is horizontal or parallel with the bottom of the dust pan, the wire fingers enter the hole $f'$, and hold the handle in that position. When the handle is in an upright position the fingers enter the hole $f$, and the brace holds the handle in that position.

The bottom of the dust pan is preferably corrugated to stiffen it.

It is obvious that my improved dust pan may be used with less exertion than is required for the ordinary form, also that it can be placed under furniture and in out of the way places.

Having thus described my invention, I claim as new and desire to secure by Letters Patent—

1. The combination of a dust-pan, a handle pivotally connected thereto and provided on opposite sides with parallel longitudinal grooves and a wire, secured at its central part to the pan and having its end portions bent upwardly and provided with in-turned hooks at their extremities adapted to engage and slide in the grooves in the opposite faces of the handle, substantially as set forth.

2. The combination of a dust-pan, a handle pivotally connected thereto and provided on opposite sides with longitudinal grooves, and having aligned recesses formed at the upper and lower ends of said grooves, and a wire secured at its central part to the pan and having its ends crossed and bent to form in-turned spring hooks adapted to slide in the grooves in the opposite sides of the handle and engage the recesses at the ends thereof, substantially as set forth.

KENT WELLINGTON GRESS.

Witnesses:
HARRISON MORAN,
JAMES MASON.